United States Patent
Stewart et al.

(10) Patent No.: US 9,538,072 B2
(45) Date of Patent: Jan. 3, 2017

(54) GESTURE INVOKED IMAGE CAPTURE

(71) Applicant: LENOVO (Singapore) PTE, LTD., New Tech Park (SG)

(72) Inventors: Aaron Michael Stewart, Raleigh, NC (US); Xin Feng, Arcadia, CA (US); Jeffrey E. Skinner, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 115 days.

(21) Appl. No.: 14/139,333

(22) Filed: Dec. 23, 2013

(65) Prior Publication Data

US 2015/0181111 A1    Jun. 25, 2015

(51) Int. Cl.
*H04N 5/232* (2006.01)

(52) U.S. Cl.
CPC ...... *H04N 5/23219* (2013.01); *H04N 5/23222* (2013.01); *H04N 5/23293* (2013.01)

(58) Field of Classification Search
CPC ............ H04N 5/23219; H04N 5/23203; H04N 5/23293; H04N 5/23222; H04N 5/23225
See application file for complete search history.

(56) References Cited

U.S. PATENT DOCUMENTS

| | | | | |
|---|---|---|---|---|
| 6,115,482 | A | * | 9/2000 | Sears ............... G09B 21/006 348/62 |
| 8,326,015 | B2 | | 12/2012 | Nepomniachtchi |
| 8,384,667 | B2 | | 2/2013 | Chang |
| 2009/0027337 | A1 | * | 1/2009 | Hildreth ............... G06F 3/011 345/158 |
| 2009/0303176 | A1 | * | 12/2009 | Chen ................... G06F 3/017 345/156 |
| 2010/0073735 | A1 | | 3/2010 | Hunt et al. |
| 2011/0102570 | A1 | * | 5/2011 | Wilf ..................... G06F 3/017 348/77 |

FOREIGN PATENT DOCUMENTS

EP    2362636 B1    4/2013

* cited by examiner

*Primary Examiner* — Tuan Ho
(74) *Attorney, Agent, or Firm* — Kunzler Law Group (57) ABSTRACT

An apparatus, system, and method are disclosed for gesture invoked image capture. An electronic device includes an image capture device. An initiation module enables the image capture device to capture images. A detection module recognizes an object held in a user's hands within a field of view of the image capture device. An imaging module captures an image of the object being held in the user's hands in response to recognizing that the user is holding an object.

15 Claims, 7 Drawing Sheets

GESTURE INVOKED IMAGE CAPTURE

FIELD

The subject matter disclosed herein relates to capturing digital images and more particularly relates to capturing digital images using gestures.

BACKGROUND

Description of the Related Art

In general, digital cameras and other image capture devices capture digital images. An image capture device may take video or still photographs and may store the images on a memory of an electronic device. Image capture devices may be integrated into various electronic devices, such as laptops, monitors, smart phones, PDAs, etc. Alternatively, image capture devices may be external devices connected to an electronic device using a wired or wireless connection.

Various image capture devices may require some type of manual user input in order to capture an image. For example, the user may have to physically push a button or switch to take an image. Alternatively, a user may have interface with image capture software to put an electronic device into an image capture mode to take an image. Manually interfacing with an electronic device to capture an image may be cumbersome and/or awkward because the user may need to hold an object with both hands while taking an image of the object. Additionally, interfacing with the image capture device may not be the most natural and/or fluid manner to invoke capturing an image.

BRIEF SUMMARY

A method for invoking image capture based on gestures is disclosed. An apparatus and computer program product also perform the functions of the method.

In one embodiment, a method is described that includes enabling an image capture device to capture images. In another embodiment, the method includes recognizing an object held in one or more hands of a user. The object, in certain embodiments, is held within a field of view of the image capture device. In a further embodiment, the method includes capturing an image of the object being held in the one or more hands of the user. In some embodiments, the image capture device captures the image in response to recognizing the object held in the one or more hands of the user.

In one embodiment, the object held in the one or more hands of the user is recognized in response to the user holding the object in a predefined holding gesture. In some embodiments, the holding gesture includes holding the corners of the object in the user's hands and/or holding the edges of the object in one or more hands. In another embodiment, the method includes comparing a ratio of a size of the object to a size of the user to a previously calculated ratio of a size of an object to the size of the user to determine the object is held in one or more hands of the user.

In a further embodiment, the method includes comparing characteristics of the object to a predefined object category to determine the type of object held in one or more hands of the user. In another embodiment, the object category comprises geometric shapes such that a shape and/or size of the object is compared to a size and/or shape of the geometric shapes.

In one embodiment, the method includes invoking an action based on one or more characteristics of the object held in the one or more hands of the user. In some embodiments, the action includes storing the image of the object in a predetermined location on a computer readable storage medium. In another embodiment, the action includes performing optical character recognition (OCR) on the image of the object to convert text in the image of the object to machine-encoded text.

In one embodiment, the method includes ignoring the image in response to not determining a type of object held in the one or more hands of the user. In another embodiment, the method includes prompting the user to specify an action associated with the image in response to not determining the type of object held in the one or more hands of the user. In one embodiment, the image capture device delays a predefined amount of time before capturing the image of the object to prevent an inadvertent image capture. In another embodiment, the method includes determining the object is held in an image capture perspective. In certain embodiments, the image capture perspective includes a substantially vertical and/or substantially horizontal perspective.

An apparatus is disclosed that, in one embodiment, includes an image capture device and a graphical monitor displaying an image captured by the image capture device. In another embodiment, the apparatus includes semiconductor hardware, a memory storing machine readable code, and/or a processor executing the machine readable code. In one embodiment, the machine readable code includes an initiation module enabling the image capture device to capture images. The machine readable code, in another embodiment, includes a detection module recognizing an object held in one or more hands of a user. In some embodiments, the object is held within a field of view of the image capture device. In one embodiment, the machine readable code includes an imaging module capturing an image of the object held in the one or more hands of the user. In certain embodiments, the image capture device captures the image in response to recognizing the object held in the one or more hands of the user.

In one embodiment, the detection module recognizes the object held in the one or more hands of the user in response to the user holding the object in a predefined holding gesture. In another embodiment, the machine readable code includes a matching module comparing one or more characteristics of the object to a predefined object category to determine a type of object held in the one or more hands of the user.

In one embodiment, the machine readable code includes a normalization module comparing a ratio of a size of the object to a size of the user to a previously calculated ratio of a size of an object to the size of the user to determine the object is held in one or more hands of the user. The machine readable code, in another embodiment, includes an action module invoking an action based on one or more characteristics of the object held in the one or more hands of the user.

A program product is disclosed that includes a computer readable storage medium storing machine readable code executable by a processor to perform the operations. In one embodiment, the operations include enabling an image capture device to capture images. In another embodiment, the operations include recognizing an object held in one or more hands of a user, the object being held within a field of view of the image capture device. In a further embodiment, the operations include capturing an image of the object held in the one or more hands of the user. In some embodiments, the image capture device captures the image in response to recognizing the object held in the one or more hands of the user.

In one embodiment, the object held in the one or more hands of the user is recognized in response to the user holding the object in a predefined holding gesture. In another embodiment, the operations include invoking an action based on one or more characteristics of the object held in the one or more hands of the user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Figure 1:
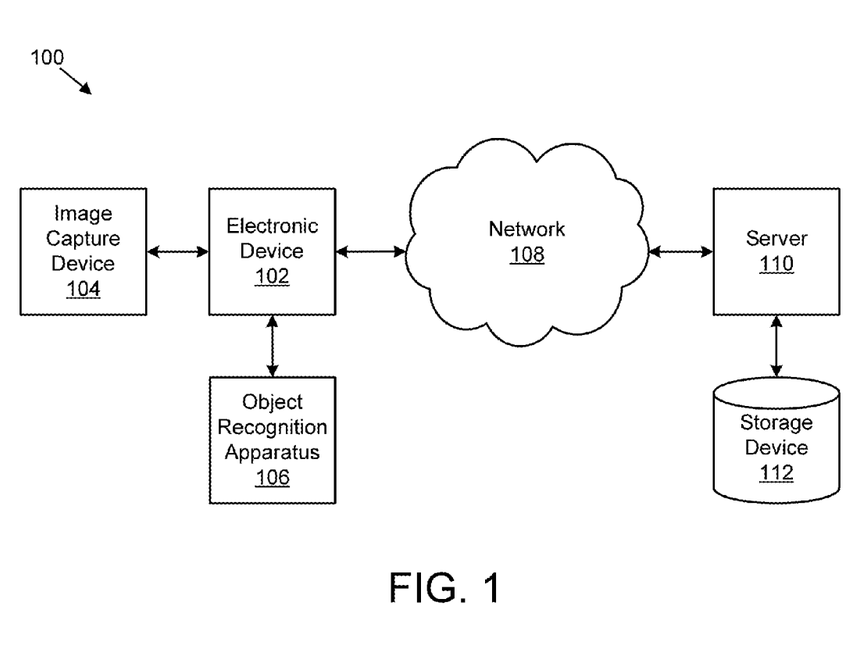
FIG. 1 is a schematic block diagram illustrating one embodiment of a system for gesture invoked image capture in accordance with the present subject matter.

Descriptions of Figures may refer to elements described in previous Figures, like numbers referring to like elements. FIG. 1 is a schematic block diagram illustrating one embodiment of a system 100 for gesture invoked image capture. In one embodiment, the system 100 includes an electronic device 102, an image capture device 104, and an object recognition apparatus 106, which are described in more detail below. In other embodiments, the system 100 includes a data network 108, a server 110, and a storage device 112, which are also described below in more detail.

In one embodiment, the system 100 includes an electronic device 102. The electronic device 102, in one embodiment, includes a laptop computer, a desktop computer, a smart phone, a tablet, a mainframe, a smart TV, a touch device, a monitor, or any electronic device 102 capable of gesture invoked image capture. In some embodiments, the electronic device 102 includes one or more computer readable storage mediums configured to store a plurality of digital images. In one embodiment, the one or more computer readable storage mediums are integrated into the electronic device 102. In other embodiments, the one or more computer readable storage mediums are external to the electronic device 102 and are operationally connected to the electronic device 102. In certain embodiments, the electronic device 102 includes a graphical monitor configured to display an image captured by an image capture device 104.

In another embodiment, the system 100 includes an image capture device 104. The image capture device 104, in one embodiment, is configured to take still photographs. In some embodiments, the image capture device 104 transmits captured images to an electronic device 102. In most embodiments, the image capture device 104 is embodied as a digital camera, which takes still photographs using an electronic image sensor. In other embodiments, the image capture device 104 includes an infrared (IR) camera that forms an image using infrared radiation. In other embodiments, the image capture device 104 captures 3D images by using more than one lens. In some embodiments, the image capture device 104 is capable of taking video, such as a digital video camera. In one embodiment, still photographs may be obtained from the video captured by the video camera. The image capture device 104 may include any type of device capable of capturing an image and transmitting the image to an electronic device 102.

In one embodiment, the image capture device 104 is integrated into the electronic device 102. For example, the image capture device 104 may be a digital camera disposed within the inside of the lid of a laptop. The digital camera may be capable of capturing a digital image when the lid of the laptop is open. In certain embodiments, opening the lid of the laptop enables the image capture device 104 such that the image capture device 104 is able to capture images in response to a user triggering the image capture capabilities of the image capture device 104. In other embodiments, the image capture device 104 may be integrated into various electronic devices 102, such as monitors, smart TVs, smart phones, tablets, or the like devices.

In another embodiment, the image capture device 104 is an external image capture device 104 operationally connected to the electronic device 102. The image capture device 104 may be operationally connected to the electronic device 102, and may communicate with the electronic device 102, using a wired connection, such as Ethernet, USB, FireWire (IEEE 1394), or the like. In other embodiments, the image capture device 104 communicates with the electronic device 102 using a wireless communication standard, such as Bluetooth®, WiFi (IEEE 802.11), near field communication (NFC), infrared, WAN, or the like.

In one embodiment, the image capture device 104 is manually enabled by a user. For example, a user may interface with a software interface to turn a digital camera on. Alternatively, a user may manually press a physical button or switch located on the image capture device 104 and/or the electronic device 102 to enable the image capture device 104. In certain embodiments, the image capture device 104 is pervasively enabled and able to capture an image. For example, an image capture device 104 integrated in a laptop may be enabled when the laptop lid is opened and/or the computer starts-up. In yet another embodiment, the image capture device 104 may be invoked by an application, such as photo capture software, or the like.

The system 100, in other embodiments, includes an apparatus 106 configured to perform object recognition. The apparatus 106, in certain embodiments, and as described below with reference to FIGS. 2 and 3, recognizes and/or identifies objects in a digital photograph captured with the image capture device 104. In certain embodiments, the apparatus 106 is located on the electronic device 102. Alternatively, the apparatus 106, in other embodiments, is located on the image capture device 104. In yet another embodiment, the apparatus 106 is located on a server 110, which is described below, that communicates with the electronic device 102 through the network 108. In other embodiments, portions of the apparatus 106 may be located on the electronic device 102, the image capture device 104, and/or the server 110.

In another embodiment, the system 100 includes a network 108. The network 108, in certain embodiments, is a digital communication network 108 that transmits digital communications related to a gesture invoked image capture system 100. The digital communication network 108 may include a wireless network, such as a wireless telephone network, a local wireless network, such as a Wi-Fi network, a Bluetooth® network, and the like. The digital communication network 108 may include a wide area network ("WAN"), a storage area network ("SAN"), a local area network ("LAN"), an optical fiber network, the internet, or other digital communication network known in the art. The digital communication network 108 may include two or more networks. The digital communication network 108 may include one or more servers, routers, switches, and/or other networking equipment. The digital communication network 108 may also include computer readable storage media, such as a hard disk drive, an optical drive, non-volatile memory, random access memory ("RAM"), or the like.

The system 100, in another embodiment, includes a server 110 that is in communication with the electronic device 102 through the digital communication network 108. In certain embodiments, the server 110 includes a laptop computer, a desktop computer, a smart phone, a tablet, a mainframe, a smart TV, a touch device, a blade center, or the like. In certain embodiments, the apparatus 106 is located on the server 110. In another embodiment, the server 110 performs all or a portion of the operations associated with gesture invoked image capture.

In one embodiment, the system 100 includes a storage device 112 that is configured to store computer readable data, such as digital photographs captured by the image capture device 104. In other embodiments, the storage device 112 stores metadata associated with one or more digital photographs. In another embodiment, the storage device 112 is integrated into the server 110. In one embodiment, the storage device 112 is an external device and communicates with the server 110 using a wired and/or wireless connection. For example, the storage device 112 may communicate with the server 110 using a wired connection such as Ethernet, USB, FireWire (IEEE 1394), or the like. In another example, the server 110 may communicate with the storage device 112 using a wireless connection such as Bluetooth®, WiFi (IEEE 802.11), near field communication (NFC), infrared, WAN, or the like.

Figure 2:
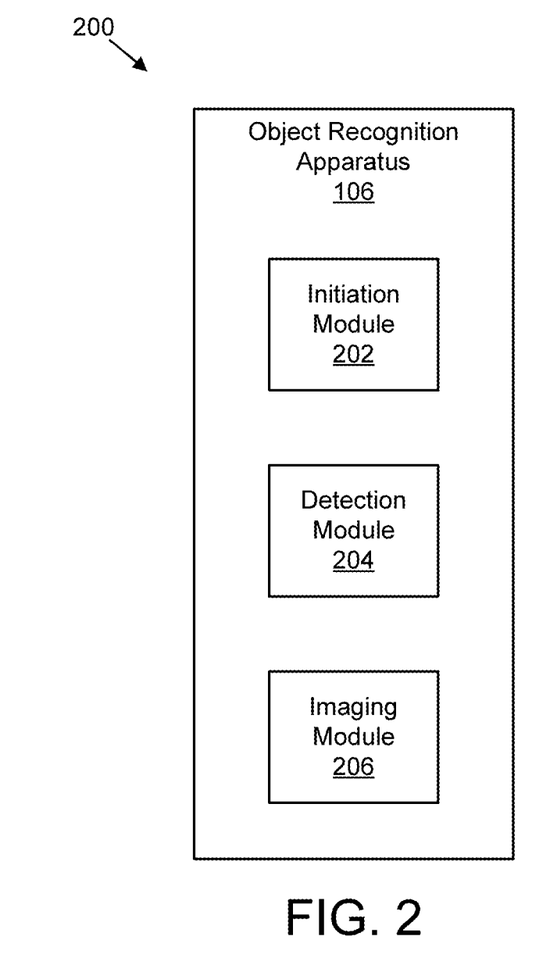
FIG. 2 is a schematic block diagram illustrating one embodiment of an apparatus for gesture invoked image capture in accordance with the present subject matter.

FIG. 2 is a schematic block diagram illustrating one embodiment of an apparatus 200 for gesture invoked image capture. The apparatus 200, in certain embodiments, includes an object recognition apparatus 106. The object recognition apparatus 106, in one embodiment, includes an initiation module 202, a detection module 204, and an imaging module 206, which are described in more detail below.

In one embodiment, the apparatus 200 includes an initiation module 202 that enables the image capture device 104 such that the image capture device 104 is able to capture images. In one embodiment, the initiation module 202 enables the image capture device 104 by turning the device 104 on. In another embodiment, the image capture device 104 is pervasively on and the initiation module 202 ensures the image capture device 104 is ready to capture one or more images. In other embodiments, the initiation module 202 may place the image capture device 104 in a gesture invoked image capture mode such that the image capture device 104 captures one or more images based on a gesture provided by a user, as is described in more detail with reference to the detection module 204.

In other embodiments, the initiation module 202 enables the image capture device 104 in response to an application invoking the image capture device 104. For example, the initiation module 202 may enable the image capture device 104 on a smart phone in response to a user executing an application configured to capture images, such as a photo application, a webcam application, a social media application, or the like. In other embodiments, the initiation module 202 enables the image capture device 104 in response to the user manually turning the image capture device 104 on. The user may execute a command on the electronic device 102, in one embodiment, to enable the image capture device 104. In other embodiments, the user may physically enable the image capture device 104 by pressing a button, switch, or the like, located on the image capture device 104 and/or the electronic device 102.

In another embodiment, the apparatus 200 includes a detection module 204 that recognizes an object held in one or more hands of a user. In some embodiments, the detection module 204 recognizes the object in response to the object being held within a field of view of the image capture device 104, e.g., in front of the image capture device 104. In another embodiment, the detection module 204 recognizes the object in response to the object being held within a viewing angle of the image capture device 104. In a further embodiment, the detection module 204 recognizes objects held to the side and/or at an angle in relation to the image capture device 104. The detection module 204, in one embodiment, recognizes the user is holding the object in front of the image capture device 104 such that the image capture device 104 captures an image of the object.

In one embodiment, the detection module 204 recognizes an object held in one or more hands of a user in response to the user holding the object using a predefined holding gesture. In one embodiment, the detection module 204 recognizes an object having a flat or planar geometry and a uniform shape being held by a user with two hands based on the position of the user's hands in relation to the object being held. For example, a user may hold a document using two hands, where one hand holds a top corner and one hand holds a bottom corner. The detection module 204 may recognize that the object is a flat object and, based on the position of the user's hands in the corners of the document, that the user wants to take an image of the document using the image capture device 104. In another example, a user may hold the document along two of its edges using two hands. Again, based on the position of the user's hands, the detection module 204 recognizes that the object is a flat object and that the user wants to take an image of the document using the image capture device 104. In one embodiment, the gesture invoked image capture provides an easy-to-use and natural way to capture an image of an object without having to interface with the image capture device 104 and/or the electronic device 102. Additionally, in another embodiment, the gesture invoked image capture provides a user with a way to quickly take an image of an object.

In another embodiment, the detection module 204 recognizes a flat object having a uniform shape being held by a user may in one hand. For example, the flat object may include a business card that the user holds in front of the image capture device 104 between two or more fingers of one hand. Based on the position of the hand and/or fingers, the detection module 204 may recognize the user is holding a business card and that the user wants to capture an image of the card.

In certain embodiments, the detection module 204 recognizes a holding gesture based on which hand is holding the object, e.g., right or left. For example, the detection module 204 may recognize flat objects when held in the right hand and non-flat objects when held in the left hand. In other embodiments, the hand being used determines the type of action to be taken with the captured image, as described below with reference to the action module 306 of FIG. 3. In other embodiments, the holding gesture may signal the detection module 204 that an object having a non-uniform shape or size is being held. Objects having various shapes and sizes may be held in the one or more hands of the user and recognized by the detection module 204. In a further embodiment, the detection module 204 recognizes three-dimensional (3D) objects being held in one or more hands of a user.

In certain embodiments, the detection module 204 maintains a collection of recognizable holding gestures. The detection module 204 may recognize a plurality of holding gestures that indicate a user is holding an object and wants to capture an image of the object. In other embodiments, a user may train a detection module 204 to recognize new holding gestures. For example, a user may want the image capture device 104 to capture an image of a document in response to the object being held with one hand in the top left corner and with the other hand in the middle of the bottom edge. In one embodiment, training the detection module 204 provides a way for the user to customize the holding gestures that invoke image capture of an object held in the user's hands.

In one embodiment, the user places the detection module 204 in a training mode, holds an object with the new holding gesture in front of the image capture device 104, and captures an image of the object being held with the new holding gesture. In some embodiments, the detection module 204 captures an image of the new holding gesture with the image capture device 104 after a predetermined amount of time has expired since being placed in the training mode. In this embodiment, the user is not required to manually capture an image with the image capture module 104. The detection module 204, in certain embodiments, updates its collection of recognizable holding gestures based on learning new gestures. In another embodiment, the user may modify and/or delete current holding gestures from the collection of recognizable holding gestures.

In certain embodiments, the detection module 204 adjusts the settings of the image capture device 104 based on the holding gesture. For example, a user holding a document by a top corner with one hand and a bottom corner with another hand may indicate that the document is a black and white document and the image capture device 104 should capture a black and white image of the object. In other embodiments, holding gestures may indicate different image capture settings such as color, ISO speed, aperture, and/or the like. Other settings may be indicated by the holding gestures, such as whether to use a flash and/or how many continuous images to capture.

In a further embodiment, the detection module 204 prevents inadvertent capture of an image. In one embodiment, the detection module 204 calculates a ratio of the object being held relative to one or more of the body of the user, one or more hands of the user, or the like, to determine the object is being held within a designated image capture space. For example, the detection module 204 may determine the designated image capture space is at least three feet in front of the camera and at chest level of the user and will only capture an image of the object when the object is held within that designated image capture area.

In another embodiment, the detection module 204 determines whether an object is being held in a designated perspective configured for image capture. In one embodiment, the image capture perspective includes a substantially vertical and/or substantially horizontal perspective. For example, the detection module 204 may determine that an object is being held sufficiently vertical to be deemed to be within a designated image capture perspective. In some embodiments, the image capture perspective includes various angles, depths, or the like. In certain embodiments, the detection module 204 analyzes the shape of the object from the view of the image capture device 104 to determine the object is held in an image capture perspective.

In some embodiments, the detection module 204 verifies the perspective of the object to confirm the user intends to capture an image of the object. In a further embodiment, verifying the perspective formalizes the holding gesture and makes it easier for the detection module 204 to confirm the user desires an image to be captured. In certain embodiments, the detection module 204, in response to determining the object is not within an image capture perspective, displays on-screen elements to help the user position the object. For example, the detection module 204 may display arrows pointing which way the user needs to move the object to put it within an image capture perspective. In another example, the detection module 204 may display a frame that the user tries to fit the object within to place the object within an image capture perspective.

In another embodiment, the detection module 204 delays a predefined amount of time before determining that the object is being held in an image capture position in order to prevent an inadvertent image capture. For example, a user may be drinking from a cup in front of the image capture device 104 within a designated image capture area. The detection module 204, however, may determine whether the object is within the image capture area for a predefined amount of time, e.g., three seconds, before the image capture device 104 captures an image of the object. In certain embodiments, the amount of time the detection module 204 delays is customizable by the user.

In certain embodiments, the detection module 204 detects an image capture gesture and initiates on-screen elements to verify the user held the object in an image capture area for a sufficient amount of time. For example, the on-screen element may be a timer that begins counting down in response to the detection module 204 recognizing the holding gesture such that when the timer reaches zero the image capture device 104 captures an image of the object. In one embodiment, the detection module 204 provides haptic feedback to signal the object was held long enough in the image capture area. For example, the electronic device 102 may provide feedback by vibrating a device connected to the electronic device 102 or the image capture device 104. In another embodiment, the detection module 204 provides audible feedback to confirm the object was held in the image capture area a sufficient amount of time. For example, the electronic device 102 and/or the image capture device 104 may provide audible feedback such as beeping, speaking, and/or providing like sounds, to confirm the object is held for a sufficient amount of time in the image capture area.

In a further embodiment, the detection module 204 presents the view of the image capture device 104 on the screen of the electronic device 102 (e.g., if the user is standing in front of the image capture device 104, the user will be displayed on the screen) and overlays a frame on the screen that the user may use as a target frame as he holds the object in front of the image capture device 104. For example, with the image capture device 104 enabled and displaying its image on the screen of the electronic device 102, a frame may be overlaid representing the image capture area such that the user moves left/right and/or toward/away from the image capture device 104 to fit the object within the framed image capture area to signal capturing an image of the object. In one embodiment, the user holds the image within the framed area for a predetermined amount of time, e.g., three seconds, to indicate to the detection module 204 that an image of the object should be taken.

In another embodiment, the detection module 204 verifies the user and/or the user's hands are positioned in an image capture orientation to determine the user desires to capture an image of the object. For example, the detection module 204 may verify the user is looking at the camera while holding the object using one or more holding gestures. In another example, the detection module 204 verifies one or more of the user's hands are facing the image capture device 104. In other embodiments, the detection module 204 determines the object is held at an image capture orientation, e.g., directly in front of the image capture device 104, at an angle relative to the image capture device 104, or the like. The detection module 204 may employ any combination of the above described embodiments to prevent inadvertently capturing an image of an object with the image capture device 104.

In one embodiment, the apparatus 200 includes an imaging module 206 that captures an image of the object held in the one or more hands of the user using the image capture device 104. In another embodiment, the image capture device 104 captures the image in response to the detection module 204 recognizing the object held in the one or more hands of the user. The imaging module 206, in certain embodiments, automatically captures an image of the object in response to the detection module 204 recognizing the object held in the one or more hands of the user.

In other embodiments, the user manually triggers the imaging module 206 by interacting with the electronic device 102 and/or the image capture device 104. For example, the user may press a button on an input device, such as a wired or wireless remote, to trigger the imaging module 206 to capture an image of the device. In another example, the user may press a key on a keyboard connected to the electronic device 102 to capture an image of the object. In yet another example, the user may touch a virtual button on a touch enabled electronic device 102, or touch enabled input device connected to the electronic device 102, to capture an image of the object.

In certain embodiments, the imaging module 206 sets an image capture timer such that the imaging module 206 waits a predetermined amount of time before capturing an image of the object. In one embodiment, the user sets the amount of time to delay before capturing an image of the object. In another embodiment, the imaging module 206 sets various image capture settings, such as using a flash, ISO speed, or the like of the image capture device 104 before capturing an image of the object. In certain embodiments, the imaging module 206 receives one or more settings from the detection module 204 in response to the detection module 206 recognizing one or more holding gestures associated with one or more image capture device 104 settings.

The imaging module 206, in certain embodiments, keystones the captured image. As used herein, keystoning refers to the process of correcting a skewed image of an object that is not placed perpendicular to a horizontal centerline of the image capture device 102 such that the image perspective appears to be substantially level. In another embodiment, the imaging module 206 corrects the orientation of the image such that the image is not skewed to the left or right and/or the top or bottom, but is substantially vertical and/or horizontal.

Figure 3:
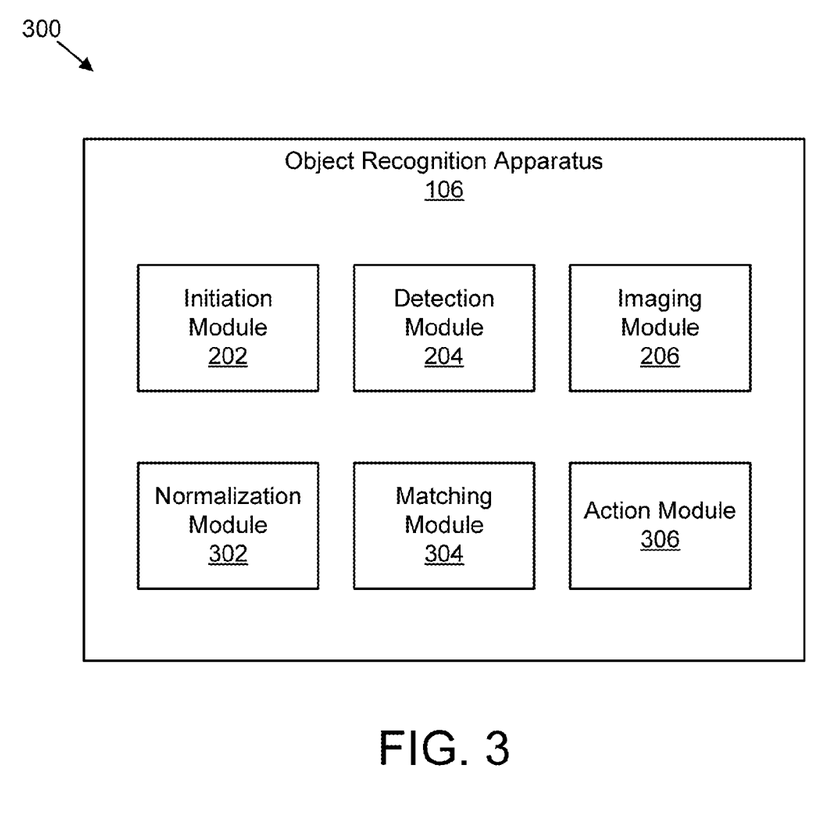
FIG. 3 is a schematic block diagram illustrating another embodiment of an apparatus for gesture invoked image capture in accordance with the present subject matter.

FIG. 3 depicts another embodiment of an apparatus 300 for gesture invoked image capture. The apparatus 300, in one embodiment, includes an object recognition apparatus 106. The object recognition apparatus 106, in certain embodiments, includes an initiation module 202, a detection module 204, and an imaging module 206, which are substantially similar to the initiation module 202, detection module 204, and imaging module 206 described above with reference to FIG. 2. In a further embodiment, the object recognition apparatus 106 includes a normalization module 302, a matching module 304, and an action module 306, which are described in more detail below.

In one embodiment, the apparatus 300 includes a normalization module 302 that compares a ratio of the size of the object being held to the size of the user to a previously calculated size of object to size of user ratio to determine the user is holding an object in an image capture position. As used herein, normalization helps determine whether a user is holding an object in an image capture holding gesture regardless the distance the image is from the image capture device 104. In some embodiments, the detection module 204 uses at least a portion of the normalization module 302 to recognize a user is holding an object. In certain embodiments, the normalization module 302 determines the user is holding an object in an image capture holding gesture based on a ratio of the size of the object to the size of the body of the user. In another embodiment, the normalization module 302 compares ratios of the size of the object to the size of the hand of the user. In certain embodiments, the normalization module 302 stores the ratio of the size of the object to the size of the user in a computer readable storage medium such that the stored ratio may be later used to help determine the user is holding an object using an image capture holding gesture.

For example, an image of a user holding a document in an image capture holding gesture in front of a laptop may be captured and the ratio of the size of the user to the size of the document may be stored. Thereafter, the user may hold a document in front of his body and the normalization module 302 uses the stored ratio of the size of the object to the size of the user to determine whether the user desires capturing an image of the object. In some embodiments, the detection module 204 uses the normalization module 302 to help detect whether a user is holding an object in an image capture holding gesture in order to prevent an inadvertent image capture by the image capture device 104.

In another embodiment, the apparatus 300 includes a matching module 304 that compares one or more characteristics of the object in the image to a predefined object category to determine a type of object held in the one or more hands of the user. The one or more characteristics, in certain embodiments, include a size, shape, depth, color, texture, or the like. In some embodiments, the predefined object category includes one or more geometric shapes, such as a square, rectangle, circle, triangle, or the like.

In further embodiments, the object category may include predefined shapes of various objects, such as mugs, business cards, documents, credit cards, smart phones, or the like. In certain embodiments, characteristics of new objects are added to the object categories by a user. For example, a user may capture an image of a mug such that the characteristics of the mug are added to an object category. Thereafter, the image capture module 104 may capture an image of a mug and the matching module 304 may compare the characteristics of the image of the mug to the characteristics of the mug in the object category.

In some embodiments, the matching module 304 generates a match in response to one or more characteristics of the object in the captured image matching one or more characteristics of an object in the object category. In certain embodiments, the action module 306, which is described below, performs an action based on the type of object in the captured image in response to the matching module 304 generating a match. In some embodiments, the matching module 304 ignores the image of the object if no match is generated and the type of object in the image is not determined. In other embodiments, the matching module 304 may prompt the user to pick a matching object from a list of available objects in response to not determining the type of object in the image. In another embodiment, the matching module 304 may prompt the user to add the object to an object category in response to not determining the type of object in the image.

The apparatus 300, in one embodiment, includes an action module 306 that invokes an action based on one or more characteristics of the object that is held in the hands of the user. In one embodiment, the action module 306 invokes an action based on the matching module 304 determining the type of object the user is holding. For example, the action module 306 may invoke a specific action for a document, a business card, a credit card, a smart phone, or the like. In another embodiment, the action module 306 initiates an action based on the user's holding gesture. For example, holding a document with two hands may initiate a save action whereas holding the document with one hand may invoke a print action.

In certain embodiments, the action module 306 invokes an action in response to the matching module 304 generating an object match based on the characteristics of the object in the image. In another embodiment, the action module 306 prompts the user to choose an action from a list of available actions. In one embodiment, the list of available actions is associated with the type of object being held. The action module 306, in some embodiments, presents a list of all available actions in response to not determining the type of object being held by the user. In some embodiments, the action module 306 may ignore the image in response to not determining the type of object in the user's hands.

There may be various actions that the action module 306 may perform in response to the image capture device 104 taking an image of the object. In one embodiment, the action module 306 invokes an action that stores the image of the object in a predetermined location on a storage device. In some embodiments, the storage device is located on the electronic device 102. In other embodiments, the storage device is located on the server 110. The storage device may include a data store, such as a database, that is configured for storing digital images.

In one embodiment, the action module 306 invokes an action that performs optical character recognition (OCR) on the image of the object to convert text in the image of the object to machine-encoded text. For example, the user may capture an image of a business card that contains text on the surface of the card. The action module 306, in response to the matching module 304 determining the object is a business card, invokes an OCR action to convert the text on the card in the image to machine-encoded text. The OCR action may be invoked for other objects that include text, such as documents, credit cards, smart phone and/or tablet screens, or the like.

Figure 4:
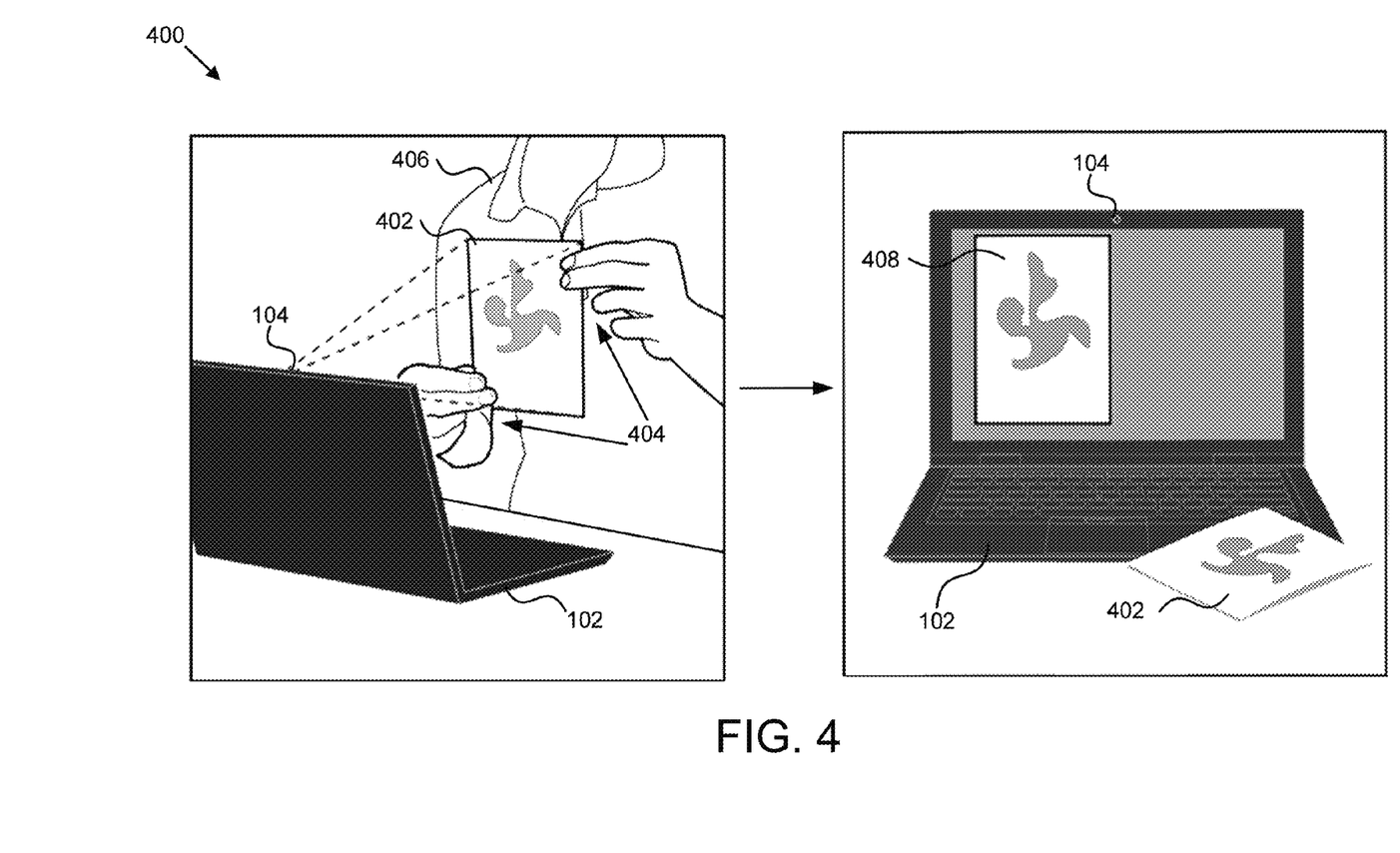
FIG. 4 is a perspective view illustrating one embodiment of a system for gesture invoked image capture in accordance with the present subject matter.

The action module 306, in another embodiment, may invoke the OCR action for an image of a credit card. In one embodiment, the action module 306 invokes a credit card transaction action in response to the OCR action converting the credit card information to machine-encoded text. In some embodiments, the action module 306 invokes a security action that corresponds to an action associated with the credit card. The security action may include, for example, taking an image of the user alongside the credit card and performing facial recognition to verify the user is the owner of the credit card, as is illustrated in FIG. 4 and described in more detail below. In another embodiment, the security action may include voice recognition, fingerprint scanning, or the like. The action module 306, in certain embodiments, invokes the security action in response to the matching module 304 determining the object contains sensitive data, such as a bank statement, a check, insurance documents, or the like.

In certain embodiments, the action module 306 invokes an action based on a quick response code (QR) printed on the object. For example, a business card may have a QR code printed on its surface that will open a webpage in a browser when scanned. The action module 306, in response to scanning the QR code in the image of the object captured by the image capture device 104, may open the website in a web browser, smart phone app, or the like. In another embodiment, the action module 306 is able to read and decode various types of barcodes, such as linear barcodes, matrix (2D) barcodes, and/or the like. In one embodiment, the action module 306 invokes an action based on different images, icons, pictures, words, designs, and/or the like that are located on the object.

In a further embodiment, in response to the matching module 304 determining the object being held is an electronic device, such as a smart phone, tablet, or the like, the action module 306 invokes one or more actions related to the electronic device. In one embodiment, the action module 306 invokes a device communication action that connects the electronic device the user is holding with the electronic device 102 using a wireless communication standard, such as Bluetooth®, NFC, WiFi, or the like, and/or a wired connection. The device communication action, in one embodiment, transfers an application state from the device being held to the electronic device 102. For example, the held device may be running a web browser with one or more open websites. The device communication action, in one embodiment, transfers the state of the web browser, or a copy of the state of the web browser, from the held device to the electronic device 102 such that a web browser running on the electronic device 102 opens the same websites. In another embodiment, the action module 306 invokes a similar device communication action in response to capturing an image of the interface of the held device (e.g., capturing an image of a web browser displayed on the held device invokes an action that opens the same web browser on the electronic device 102).

In another embodiment, the action module 306 invokes a content transfer action that transfers different types of content between a held device and the electronic device 102. For example, a movie, music, digital images, electronic documents, or the like may be transferred over a wireless and/or wired communication channel from the held device to the electronic device 102. In another embodiment, the action module 306 may invoke an action that prompts the user to select an action associated with the held device, such as transferring data and/or content, transferring an application state, and/or the like.

The action module 306, in a further embodiment, invokes an action based on the matching module 304 determining the object being held is a unique object. In one embodiment, the unique object includes a corresponding action that the action module 306 invokes in response to determining the held object is a unique and/or special object. For example, the held object may be a custom card that includes a "game token" icon. A user may hold the custom card in front of a video game console, such as an XBox® or Playstation®, that includes an integrated digital camera. The digital camera may capture an image of the card and, in response to determining the object is a custom game card, the action module 306 may initiate a game action that provides an in-game enhancement for an interactive game, such as a video game, a flash game, a massively multiplayer online role-playing game, or the like.

In various embodiments, the action module 306 invokes a print action that prints a copy of the image and/or the object displayed in the image. In another embodiment, the action module 306 invokes a social media action that posts the image on a user's social media network, such as Facebook®, Twitter®, and/or the like. In one embodiment, the user selects an action for the action module 306 to invoke in response to capturing the image of the held object. In some embodiments, the holding gesture used to hold the object determines the action invoked by the action module 306. In a further embodiment, the action module 306 invokes a plurality of actions. The plurality of actions may be invoked at one time, if possible, or sequentially such that one action is initiated in response to the action module 306 completing an action.

FIG. 4 depicts one embodiment of a system 400 for gesture invoked image capture. In one embodiment, an electronic device 102 includes an integrated image capture device 104, such as a digital camera. In another embodiment, the image capture device 104 is enabled and is able to capture images. In a further embodiment, a user 406 holds an object 402 in both hands 404 within a field of view of the image capture device 104. The user 406, as shown in FIG. 4, may hold the object 402 using a holding gesture defined by the position of one or more hands 404 of the user 406. In certain embodiments, the detection module 204 recognizes the holding gesture, indicating the user 406 desires to capture an image of the object 402. The imaging module 206, in some embodiments, captures an image of the object 402 using the image capture device 104 in response to the detection module 204 recognizing the object 402 being held in the user's 406 hands 404.

In certain embodiments, an action module 306 invokes an action based on one or more characteristics of the object 402 that is held in the user's 406 hands 404. In another embodiment, the matching module 304 compares the characteristics of the object 402 to a category of predefined objects to determine the type of object 402 being held and, if a match is found, the action module 306 performs an action associated with that type of object 402. For example, as depicted in FIG. 4, the object 402 may be a flat object having a standard shape and size. The matching module 304 may compare the shape and size to various predefined objects having similar shapes and sizes.

The matching module 304, for example, may determine the object 402 is a document. The action module 306, in response to the matching module 304 determining the object 402 is a document, invokes an action associated with a document, such as a display action that presents an image 408 of the object 402 on the display of the electronic device 102. The action module 306, in one embodiment, also invokes a save action to store the image in a data store located on the electronic device 102, the server 110, and/or the storage device 112. In other embodiments, the action module 306 invokes one or more actions associated with the object 402. In some embodiments, the imaging module 206 keystones the captured image such that the image of the object 402 is substantially rectangular. In another embodiment, the imaging module 206 corrects the orientation of the image such that the image is not skewed to the left or right and/or the top or bottom, but is substantially vertical and/or horizontal.

Figure 5:
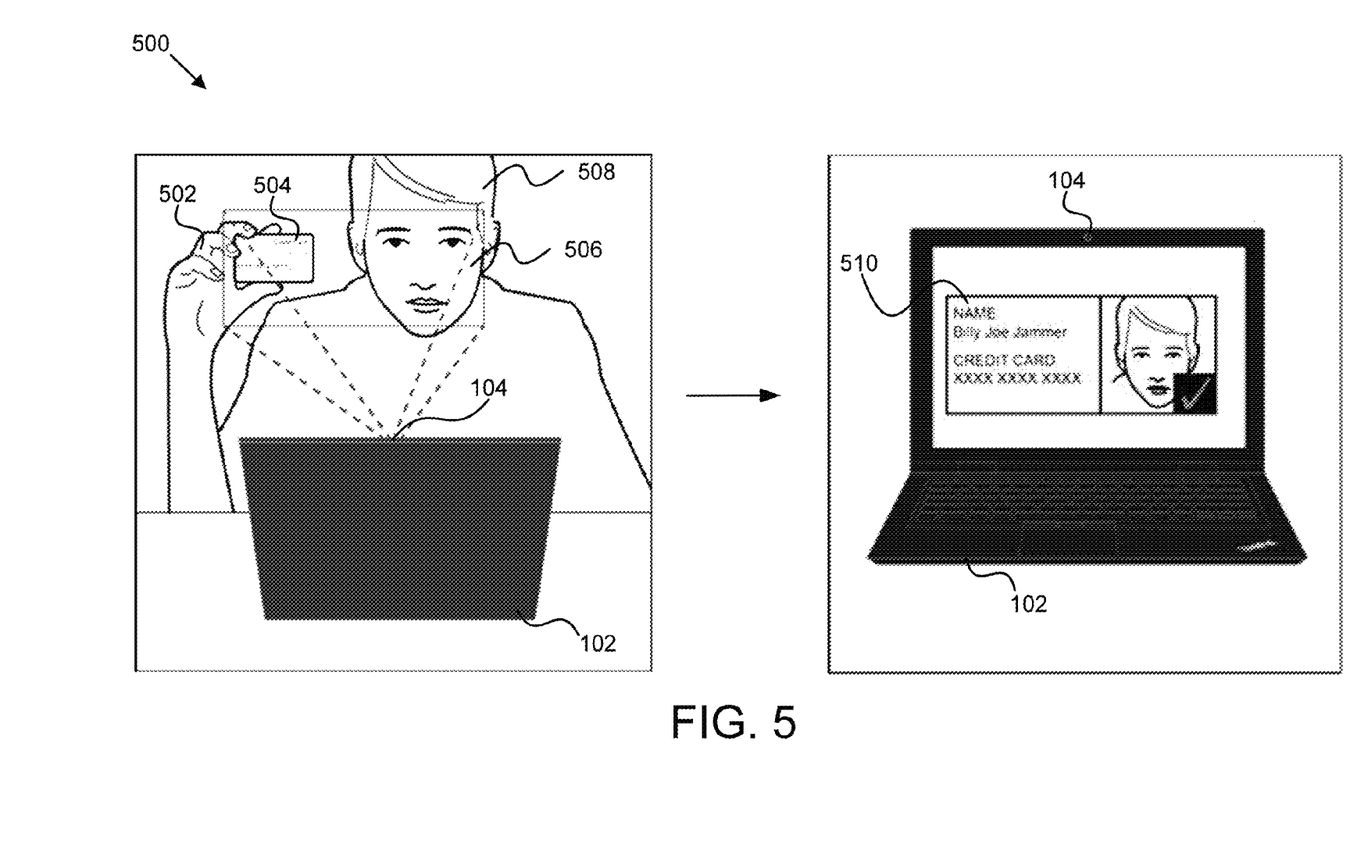
FIG. 5 is a perspective view illustrating another embodiment of a system for gesture invoked image capture in accordance with the present subject matter.

FIG. 5 depicts another embodiment of a system 500 for gesture invoked image capture. In one embodiment, an electronic device 102 includes an integrated image capture device 104, such as a digital camera. In another embodiment, the image capture device 104 is enabled and is able to capture images. In a further embodiment, a user 508 holds an object 504 in a single hand 502 in front of the image capture device 104. As shown in the FIG. 5, the user 508 may hold the object 504 in a holding gesture that is recognizable by the detection module 204 such that the detection module 204 recognizes the user 508 desires taking an image of the object 504. For example, the holding gesture may be holding an object in one hand between one or more fingers and a thumb.

In the depicted embodiment, the object 504 is a credit card 504. In one embodiment, the imaging module 206 captures an image of the credit card 504 in response to the detection module 204 recognizing the credit card 504 held in the hand of the user 508. The matching module 304, in one embodiment, matches the characteristics of the credit card 504 (e.g., a shape, size, text, or the like) to the stored characteristics of a credit card in an object category to determine the object 504 type.

In response to the matching module 304 determining the object 504 is a credit card, the action module 306 may invoke one or more credit card related actions. For example, the action module 306 may invoke a security action that performs facial recognition using the user's 508 facial 506 characteristics to verify the credit card 504 belongs to the user 508. The image of the user 508, in one embodiment, is compared against a previously stored image of the user 508. In another embodiment, the action module 306 invokes a credit card transaction action, which may include storing and/or displaying 510 the credit card information on the electronic device 102 along with an associated image of the user 508.

Figure 6:
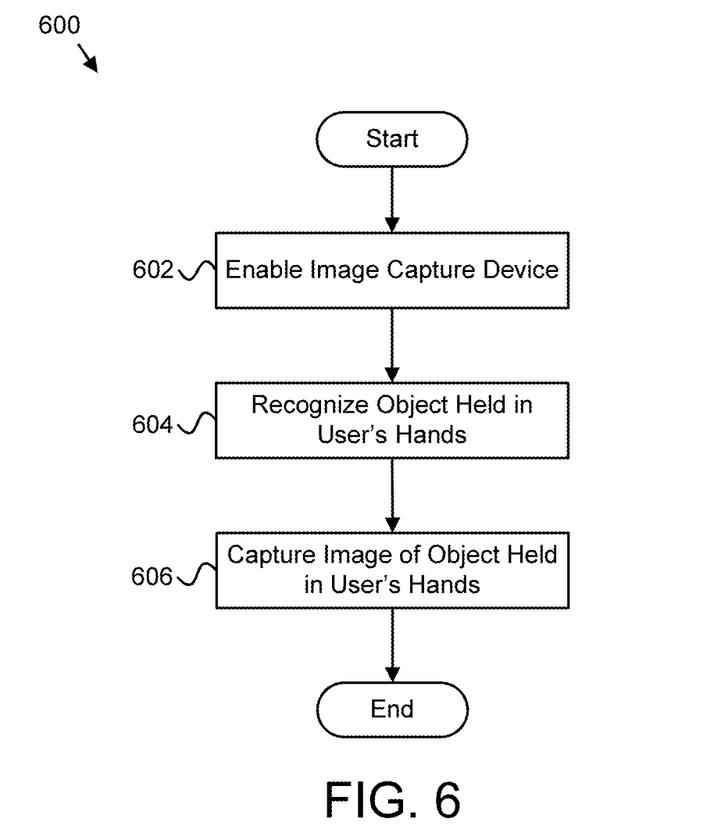
FIG. 6 is a schematic flow chart diagram illustrating one embodiment of a method for gesture invoked image capture in accordance with the present subject matter.

FIG. 6 depicts one embodiment of a method 600 for gesture invoked image capture. In one embodiment, the method 600 begins and the initiation module 202 enables 602 an image capture device 104 to capture images. In another embodiment, the image capture device 104 is operationally connected to an electronic device 102 by a wired or wireless communication connection. In some embodiments, the image capture device 104 is integrated into the electronic device 102, such as a digital camera disposed within a lid of a laptop computer, the front and/or back of a smart phone, or the like.

In one embodiment, the detection module 204 recognizes 604 an object held in one or more of the user's hands. In certain embodiments, the detection module 204 recognizes an object held in front of the image capture device 104 and/or within a viewing angle of the image capture device 104. In response to the detection module 204 recognizing the object held in the hands of the user, in another embodiment, an imaging module 206 captures 606 an image of the object using the image capture device 104 and the method 600 ends.

Figure 7:
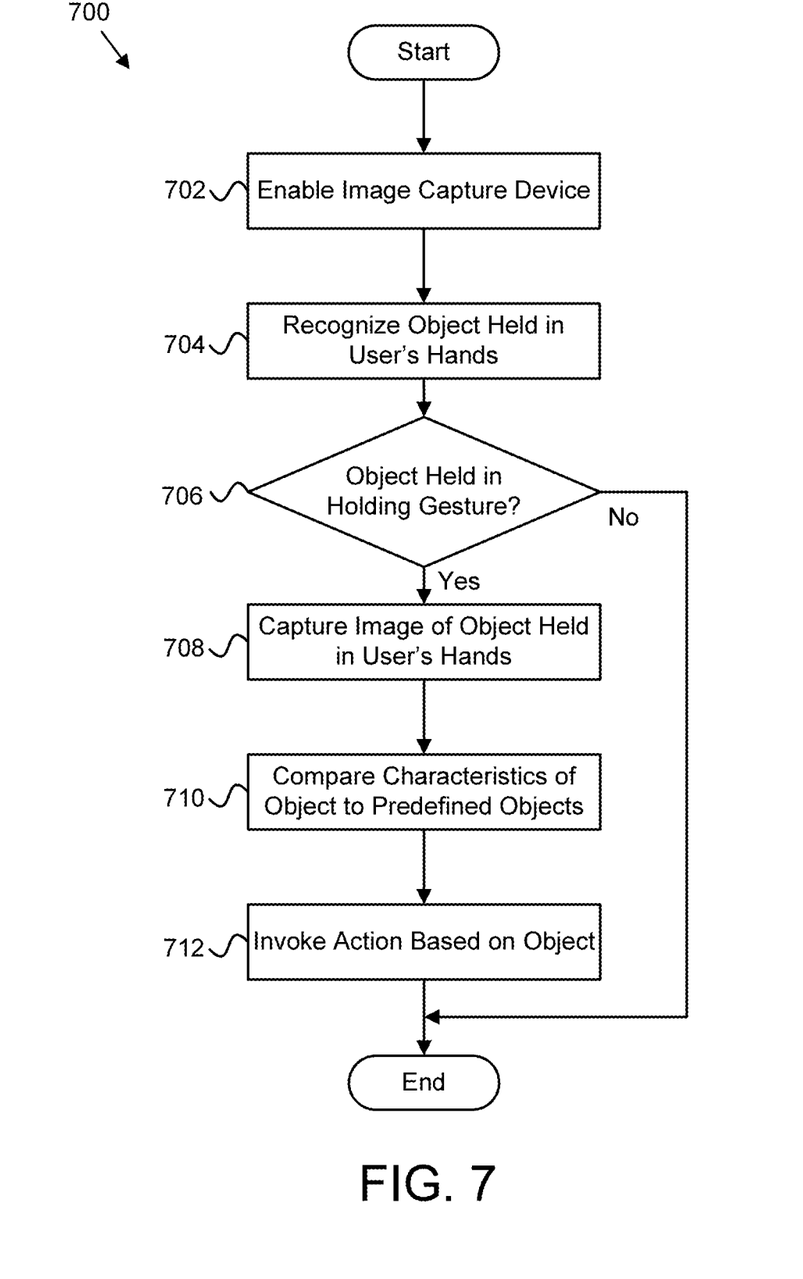
FIG. 7 is a schematic flow chart diagram illustrating one embodiment of another method for gesture invoked image capture in accordance with the present subject matter.

FIG. 7 depicts one embodiment of another method 700 for gesture invoked image capture. In one embodiment, the method 700 begins and the initiation module 202 enables 602 an image capture device 104 to capture images, such as a digital camera, an IR camera, or the like. In another embodiment, the detection module 204 recognizes 704 an object held within a field of view of an image capture device 104 in one or more of the user's hands. In some embodiments, the detection module 204 determines 706 a user holding the object in an image capture holding gesture. For example, the user may hold a document by a top corner with one hand and a bottom corner in another hand, signaling the detection module 204 that an image of the object is desired. In some embodiments, the detection module 204 recognizes a holding gesture that includes holding the object with a single hand, with certain fingers, with a certain number of fingers, or the like.

In another embodiment, the detection module 204 determines 706 the object is being held in an image capture holding gesture in response to a normalization module 302 comparing a ratio of a size of the object to a size of the user to a previously calculated ratio of a size of an object to the size of the user and determining the ratios are substantially similar. In one embodiment, if the detection module 204 does not determine 706 the user is holding the object using an image capture holding gesture and, therefore, does not desire capturing an image of the object, the method 700 ends.

If the detection module 204, in one embodiment, determines 706 the user is holding the object using an image capture holding gesture, the imaging module 206 captures 708 an image of the object held in the one or more hands of the user. In certain embodiments, the image capture device 104 captures 708 an image of the object. In another embodiment, the imaging module 204 keystones the captured image in order to correct perspective issues associated with the image. In other embodiments, the imaging module 204 adjusts various settings of the image capture device 104 based on the user's holding gesture, such as ISO speed, turning the flash on/off, or the like.

In a further embodiment, the matching module 304 compares 710 one or more characteristics of the object to a predefined object category to determine the type of object being held in the one or more hands of the user. In one embodiment, the matching module 304 compares 710 the size and shape of the object being held with the sizes and shapes of various objects to determine the type of object being held. For example, if a user is holding credit card, the matching module 304 compares 710 the size and shape of the credit card against the sizes and shapes of different objects, including credit cards, in order to determine the object is a credit card. The matching module 304, in some embodiments, compares 710 other characteristics, such as colors, textures, text, images, or the like.

In one embodiment, the action module 306 invokes 712 an action based on one or more characteristics of the object held in the one or more hands of the user. In certain embodiments, the action module 306 invokes 712 an action in response to the matching module 304 comparing 710 one or more characteristics of the object and determining the type of object being held (e.g., a credit card, document, smart phone, or the like). In certain embodiments, the action module 304 invokes 712 an action based on the user's holding gesture. For example, the action module 306 may save a copy of an image of a document in response to the user holding the document with one hand on the left edge and another hand on the right edge. The action module 304 may invoke 712 one or more actions, as described above with reference to FIG. 3, as related to the object being held. In some embodiments, the action module 304 prompts the user to specify an action in response to not determining the type of object being held. And the method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    enabling an image capture device to capture images;
    recognizing an object held in one or more hands of a user, the object being held within a field of view of the image capture device, wherein the object is recognized in response to determining that the user is holding the object in a predefined holding gesture;
    capturing an image of the object held in the one or more hands of the user, the image capture device capturing the image in response to recognizing the object held in the one or more hands of the user; and
    invoking an action based on one or more characteristics of the object held in the one or more hands of the user.

2. The method of claim 1, wherein the holding gesture comprises one or more of holding one or more corners of the object in one or more hands and holding one or more edges of the object in one or more hands.

3. The method of claim 1, further comprising comparing a ratio of a size of the object to a size of the user to a previously calculated ratio of the size of the object to the size of the user to determine that the object is held in an image capture position, the size of the user comprising one of the size of at least a portion of the body of the user and the size of one or more hands of the user.

4. The method of claim 1, further comprising comparing one or more characteristics of the object to a predefined object category to determine a type of object held in the one or more hands of the user.

5. The method of claim 4, wherein an object category comprises one or more geometric shapes, one or more of a shape and size of the object being compared to one or more of a shape and size of the one or more geometric shapes.

6. The method of claim 1, wherein the action comprises storing the image of the object in a predetermined location on a storage device.

7. The method of claim 1, wherein the action comprises performing optical character recognition (OCR) on the image of the object to convert text in the image of the object to machine-encoded text.

8. The method of claim 1, further comprising ignoring the image in response to not determining a type of object held in the one or more hands of the user.

9. The method of claim 1, further comprising prompting the user to specify an action associated with the image in response to not determining a type of object held in the one or more hands of the user.

10. The method of claim 1, wherein the image capture device delays a predefined amount of time before capturing the image of the object to prevent an inadvertent image capture.

11. The method of claim 1, further comprising determining that the object is held in an image capture perspective, the image capture perspective comprising one or more of a substantially vertical and substantially horizontal perspective.

12. An apparatus comprising:
    a processor;
    an image capture device accessible by the processor;
    a graphical monitor that displays an image captured by the image capture device;
    an initiation module that enables the image capture device to capture images;
    a detection module that recognizes an object held in one or more hands of a user, the object being held within a field of view of the image capture device, wherein the object is recognized in response to determining that the user is holding the object in a predefined holding gesture;
    an imaging module that captures an image of the object held in the one or more hands of the user, the image capture device capturing the image in response to recognizing the object held in the one or more hands of the user; and
    an action module that invokes an action based on one or more characteristics of the object held in the one or more hands of the user.

13. The apparatus of claim 12, further comprising a matching module that compares one or more characteristics of the object to a predefined object category to determine a type of object held in the one or more hands of the user.

14. The apparatus of claim 12, further comprising a normalization module that compares a ratio of a size of the object to a size of the user to a previously calculated ratio of the size of the object to the size of the user to determine the object is held in an image capture position, the size of the user comprising one of the size of at least a portion of the body of the user and the size of one or more hands of the user.

15. A program product comprising a non-transitory computer readable storage medium storing machine readable code executable by a processor to:
    enable an image capture device to capture images;
    recognize an object held in one or more hands of a user, the object being held within a field of view of the image capture device, wherein the object is recognized in response to determining that the user is holding the object in a predefined holding gesture;
    capture an image of the object held in the one or more hands of the user, the image capture device capturing the image in response to recognizing the object held in the one or more hands of the user; and
    invoke an action based on one or more characteristics of the object held in the one or more hands of the user.

* * * * *